(12) United States Patent
Nadot et al.

(10) Patent No.: US 8,437,150 B1
(45) Date of Patent: May 7, 2013

(54) DUAL FREQUENCY HEATING, MELTING AND STIRRING WITH ELECTRIC INDUCTION POWER

(75) Inventors: Vladimir V. Nadot, Sicklerville, NJ (US); Oleg S. Fishman, Maple Glen, PA (US)

(73) Assignee: Inductotherm Corp., Rancocas, NJ (US)

( * ) Notice: Subject to any disclaimer, the term of this patent is extended or adjusted under 35 U.S.C. 154(b) by 285 days.

(21) Appl. No.: 12/834,600

(22) Filed: Jul. 12, 2010

Related U.S. Application Data (60) Provisional application No. 61/224,859, filed on Jul. 11, 2009.

(51) Int. Cl.
*H02M 3/335* (2006.01)
(52) U.S. Cl.
USPC ............................................................ 363/17
(58) Field of Classification Search ................... 363/17, 363/37, 98, 132; 219/661, 663, 626, 666
See application file for complete search history.

(56) References Cited

U.S. PATENT DOCUMENTS

| | | | | |
|---|---|---|---|---|
| 4,504,895 A | * | 3/1985 | Steigerwald | 363/17 |
| 5,875,103 A | * | 2/1999 | Bhagwat et al. | 363/17 |
| 7,221,107 B2 | * | 5/2007 | Melis | 315/291 |
| 2003/0021131 A1 | * | 1/2003 | Nadot et al. | 363/55 |

* cited by examiner

*Primary Examiner* — Adolf Berhane
(74) *Attorney, Agent, or Firm* — Philip O. Post (57) ABSTRACT

A dual frequency output is provided from a DC to AC inverter. An H-bridge inverter is provided with switching arranged to reconfigure the inverter from half-bridge to full bridge so that the inverter's output can be switched from high frequency to low frequency, respectively. A resonant load tuning capacitance is utilized across the input of the inverter subsequent to the DC link input (for example from an AC utility fed rectifier) to the inverter. The inductive load circuit at the output of the inverter may be one or more induction coils surrounding a crucible in which an electrically conductive material is placed, or susceptor, or one or more inductors used to heat treat an electrically conductive material. In an alternative arrangement an H-bridge inverter is utilized in both the high and low frequency modes while a tank capacitance is in the circuit, or shorted out of the circuit, respectively, in the high or low frequency modes.

13 Claims, 12 Drawing Sheets

DUAL FREQUENCY HEATING, MELTING AND STIRRING WITH ELECTRIC INDUCTION POWER

CROSS REFERENCE TO RELATED APPLICATIONS

This application claims the benefit of U.S. Provisional Application No. 61/224,859 filed Jul. 11, 2009, which is hereby incorporated by reference in its entirety.

FIELD OF THE INVENTION

The present invention relates to apparatus and method for dual frequency heating, melting or stirring with electric induction power.

BACKGROUND OF THE INVENTION

Typically changes in electric induction power frequencies for heating, melting or stirring applications are achieved by using separate power supplies or varying the output frequency of a direct (DC) current to alternating (AC) current inverter by gate control of switching devices used in the inverter.

One object of the present invention is to provide a power supply incorporating a DC to AC inverter capable of operating at two different output frequencies by switched rearrangement of an H-bridge inverter for inductively heating, melting or stirring electrically conductive materials.

BRIEF SUMMARY OF THE INVENTION

In one aspect the present invention is apparatus for, and method of, providing a dual frequency output from a DC to AC inverter for electric induction heating, melting or stirring of a composition or workpiece in an inductive load circuit. An H-bridge inverter is provided with switching arranged to reconfigure the inverter from half bridge to full bridge so that the inverter's output can be switched from high frequency to low frequency, respectively. A resonant load tuning capacitance is utilized across the input of the inverter, subsequent to the DC link input (for example from an AC utility fed rectifier) to the inverter. The inductive load circuit at the output of the inverter may be one or more induction coils surrounding a crucible in which an electrically conductive material is placed, or a susceptor, or one or more inductors used to heat treat an electrically conductive material brought within the vicinity of a magnetic flux field generated by alternating current flow in the one or more inductors. In some arrangements of the invention a tank capacitance connected across the legs of the H-bridge inverter is removed from the circuit when the inverter operates in the low frequency mode.

In another aspect the present invention is apparatus for, and method of, dual frequency electric induction heating, melting or stirring, of a composition or workpiece in an inductive load circuit. A dual frequency switch is inserted across a tank capacitance of a full bridge inverter having a resonant load tuning capacitance connected across the direct current input of the full bridge inverter. The dual frequency switch has a low frequency switch position and a high frequency switch position. In the high frequency switch position the tank capacitance is in the inverter circuit, and in the low frequency switch position the dual frequency switch shorts out the tank capacitance.

The above and other aspects of the invention are set forth in this specification and the appended claims.

BRIEF DESCRIPTION OF THE DRAWINGS

The foregoing brief summary, as well as the following detailed description of the invention, is better understood when read in conjunction with the appended drawings. For the purpose of illustrating the invention, there is shown in the drawings exemplary forms of the invention that are presently preferred; however, the invention is not limited to the specific arrangements and instrumentalities disclosed in the following appended drawings.

DETAILED DESCRIPTION OF THE INVENTION

Figure 1A:
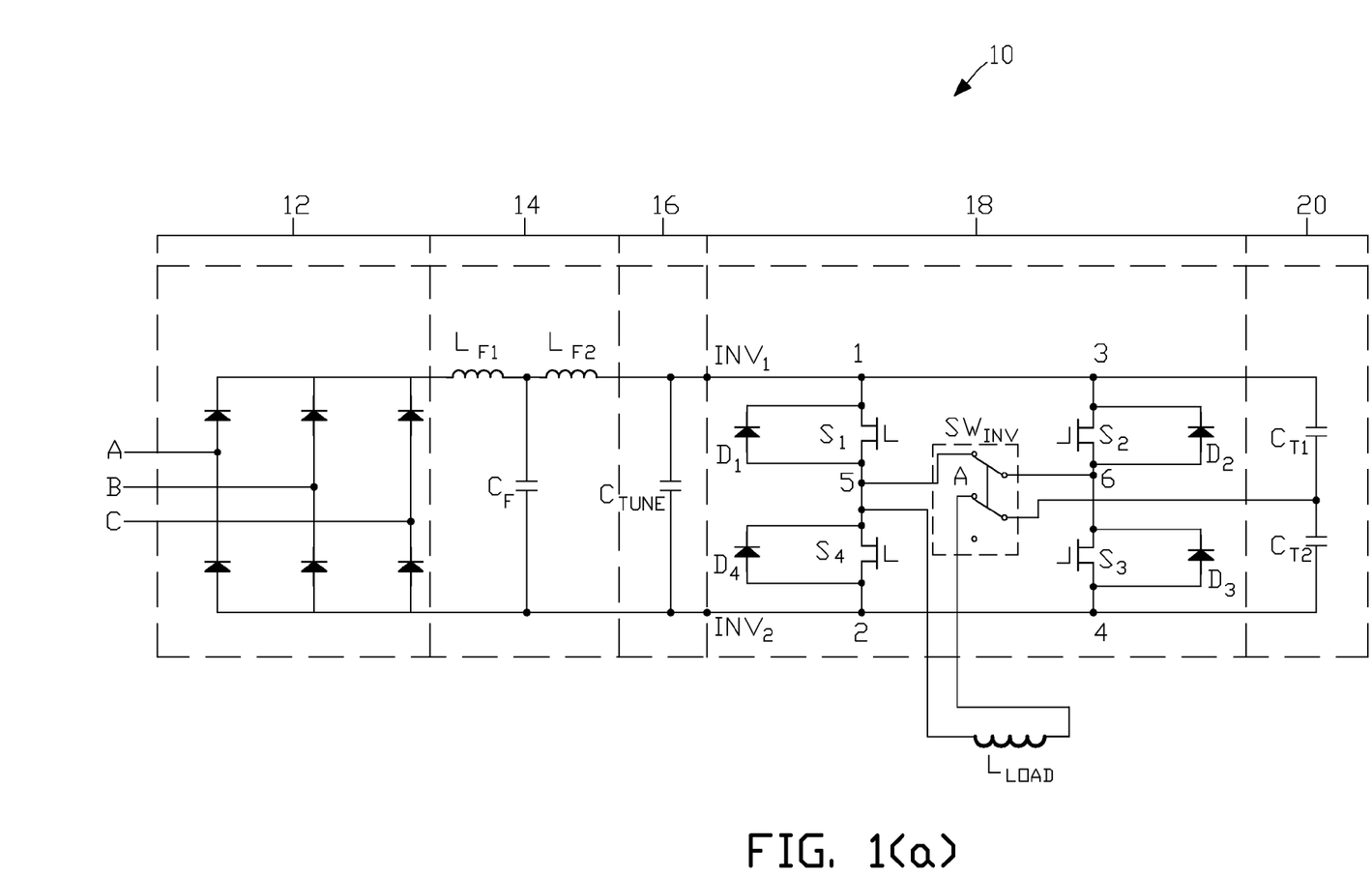
FIG. 1(a) illustrates one example of a power supply apparatus used in the present invention configured for inverter half-bridge series-resonance operation.
Figure 1B:
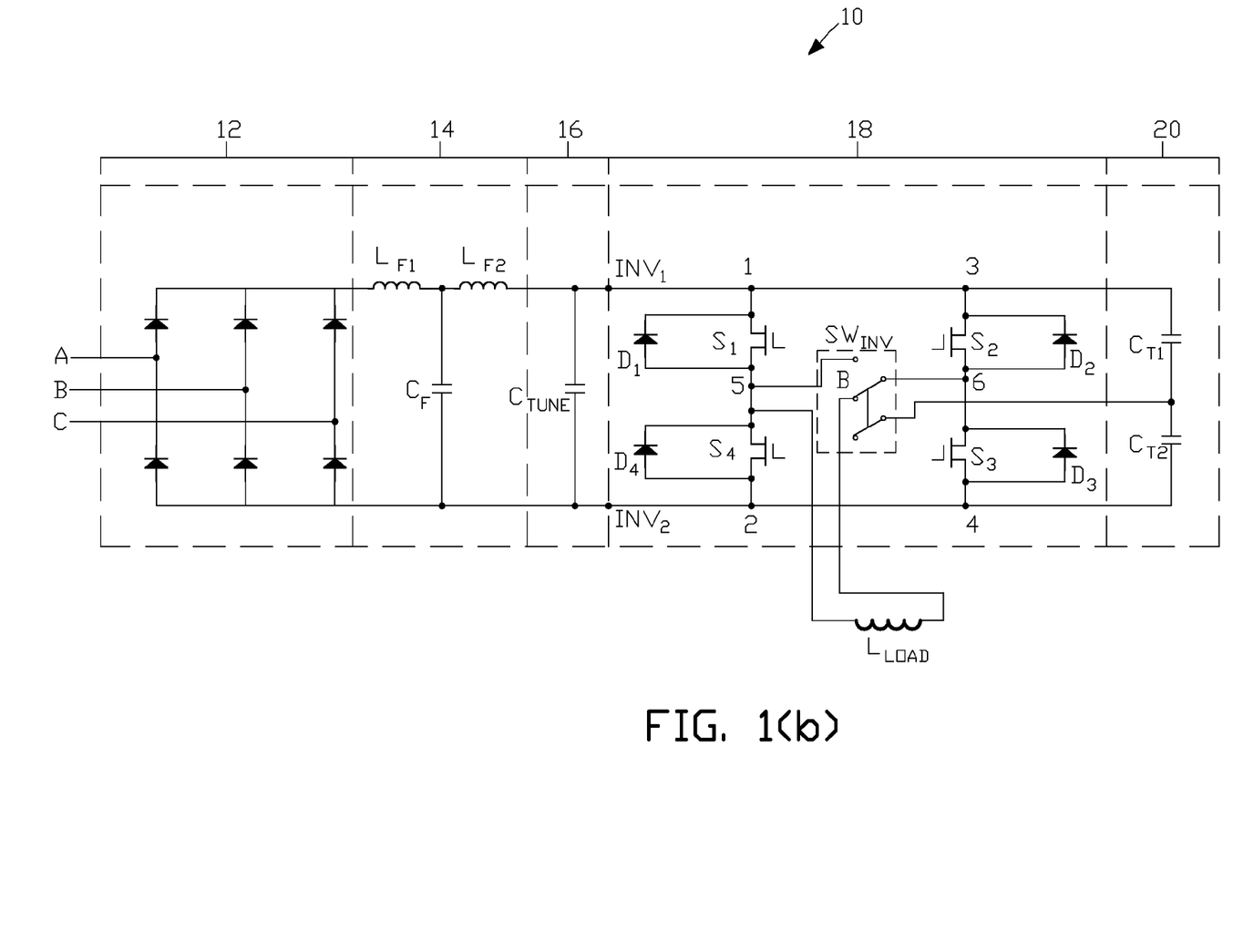
FIG. 1(b) illustrates the power supply apparatus in FIG. 1(a) configured for inverter full-bridge operation.

There is shown in FIG. 1(a) and FIG. 1(b) one example of the present invention. Apparatus 10 comprises: AC to DC rectifier section 12 represented, for example, by a three phase rectifier with suitable AC input, for example, from a three phase (A, B, C) utility source; DC (link) section 14 represented, for example, by capacitor $C_f$ and chokes/reactors $L_{F1}$ and $L_{F2}$; resonant load tuning capacitance section 16 represented by capacitor $C_{TUNE}$; DC to AC inverter section 18; and tank (resonant) capacitance section 20, represented, for example, by capacitors $C_{T1}$ and $C_{T2}$. The resonant load tuning capacitor used herein is as disclosed in U.S. Pat. No. 6,696,770 B2 (Induction Heating or Melting Power Supply Utilizing a Tuning Capacitor). Inverter AC output switching device SW$_{INV}$ switches between high frequency output mode (FIG. 1(a)) and low frequency output mode (FIG. 1(b)) as further described below.

Referring to FIG. 1(a) when switching device SW$_{INV}$ is in switch position A, the inverter is configured as a half bridge series-resonance loaded (L$_{LOAD}$) inverter. The circuit for each of the two inverter branches or legs (between terminals 1 and 2, and between terminals 3 and 4 of the inverter) are connected in parallel via interconnection with the switching device SW$_{INV}$. The output frequency of the inverter will be near resonance, that is within plus or minus 20 percent of actual resonant frequency, f$_{RES1}$, which can be calculated from the following equation:

$$f_{RES1} = \frac{1}{2\pi\sqrt{L_{LOAD} \cdot (C_{T1} + C_{T2})}}. \quad [\text{equation (1)}]$$

For example if the inductance of the equivalent load inductor L$_{LOAD}$ is 500 microhenries and the capacitance of each tank capacitor C$_{T1}$ and C$_{T2}$ is equal to 100 microFarads, half-bridge resonant frequency, f$_{RES1}$, will be 500 Hertz.

Referring to FIG. 1(b) when switching device SW$_{INV}$ is in switch position B, the inverter is configured as a full H-bridge inverter. Inductor load L$_{LOAD}$ is connected in the diagonal (across terminals 5 and 6 of the inverter) of the two inverter branches via interconnection with switching device SW$_{INV}$. The output frequency of the inverter will be near resonance, that is within plus or minus 20 percent of actual resonant frequency, f$_{RES2}$, which can be calculated from the following equation:

$$f_{RES2} = \frac{1}{2\pi\sqrt{L_{LOAD} \cdot C_{TUNE}}}. \quad [\text{equation (2)}]$$

For example if the inductance of the equivalent load inductor L$_{LOAD}$ is 500 microhenries and the capacitance of tuning capacitor C$_{TUNE}$ is equal to 10,000 microFarads, full bridge resonant frequency, f$_{RES2}$, will be 70 Hertz.

In half-bridge mode, power output from the inverter is controlled by changing the inverter operating frequency and pulse width modulation. In full bridge resonance mode, power output from the inverter can be controlled solely by pulse width modulation.

Figure 2A:
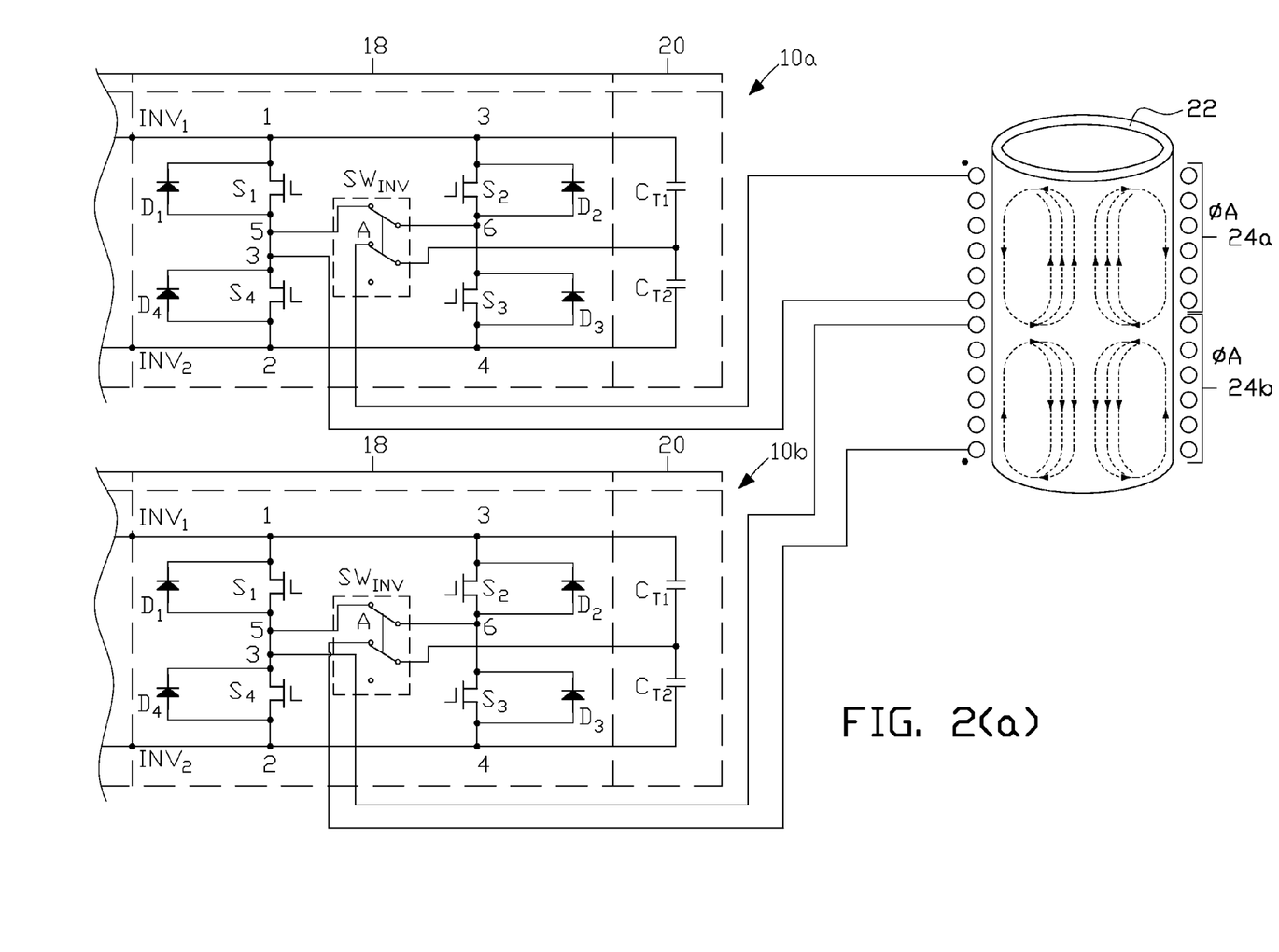
FIG. 2(a) illustrates another example of a power supply apparatus used in the present invention configured for electric induction melting of an electrically conductive material placed within a crucible.
Figure 2B:
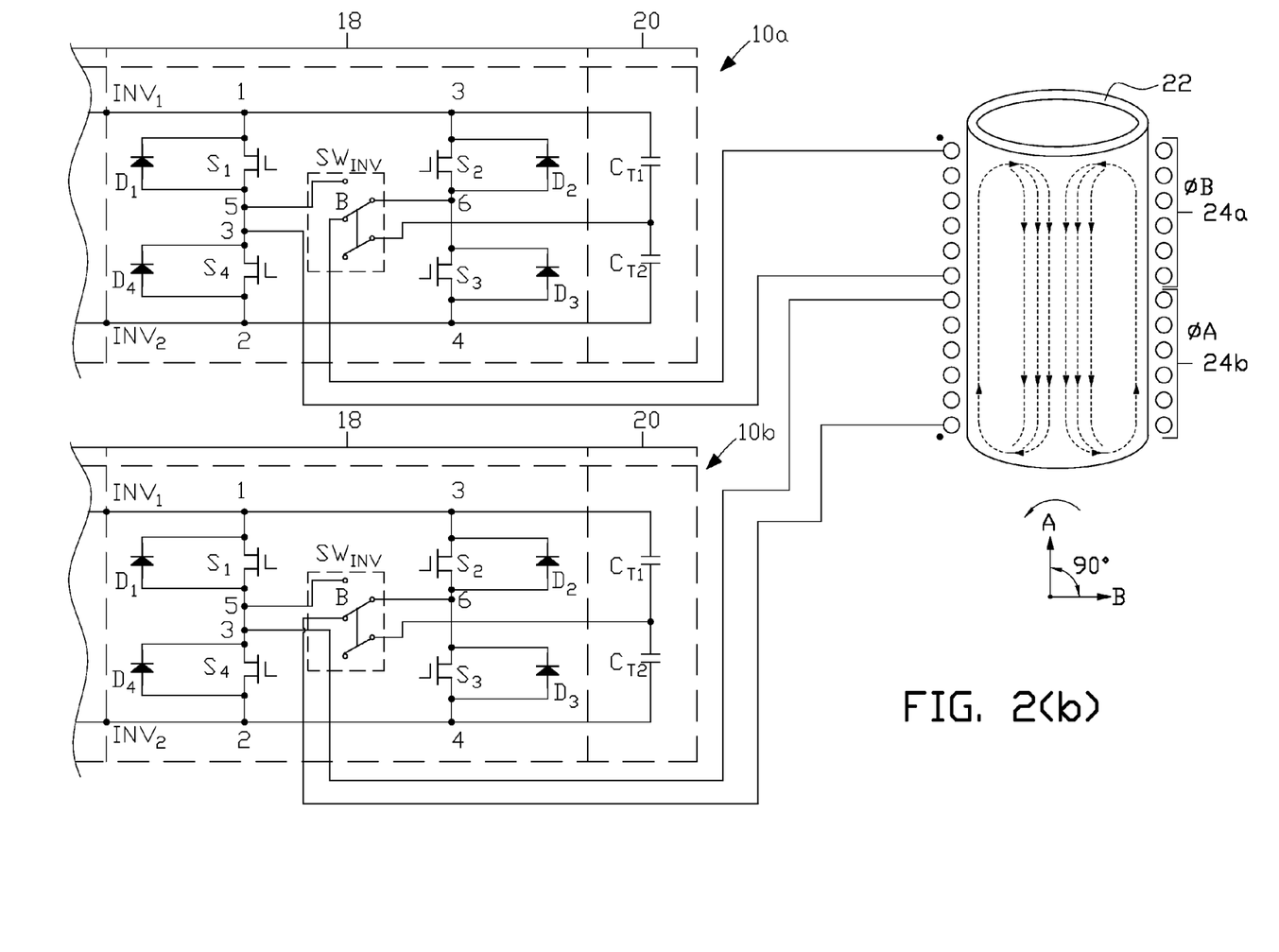
FIG. 2(b) illustrates the power supply apparatus in FIG. 2(a) configured for electromagnetic stirring of an electrically conductive material placed within the crucible.

There is shown in FIG. 2(a) and FIG. 2(b) one application of the power supply apparatus of the present invention. Two power supplies 10a and 10b are utilized with each power supply connected to separate load inductors 24a and 24b (counter-wound coils in this example as diagrammatically indicated by the "dot" convention) surrounding crucible 22, in which an electrically conductive material can be placed, for example, metal charge in solid or solid/molten combination. Power supplies 10a and 10b are partially illustrated in FIG. 2(a) and FIG. 2(b) for convenience and are similar to the power supplies shown in FIG. 1(a) and FIG. 1(b). In FIG. 2(a), both inverters operate in half-bridge (high frequency), output phase synchronized, resonant mode to inductively melt solid metal in the crucible. In FIG. 2(b) both inverters operate in full-bridge (low frequency) resonant mode to electromagnetically stir molten metal at a reasonably low frequency without excess agitation. The outputs of the two inverters in FIG. 2(b) are arranged to be 90 degrees out-of-phase to produce a running electromagnetic field that induces a unidirectional stirring pattern in the molten metal as shown, for example, in FIG. 2(b); changing the phase shift from plus 90 degrees to minus 90 degrees will reverse the direction of electromagnetic stirring (represented by arrows and dashed lines) in FIG. 2(b).

Although two coils are shown in FIG. 2(a) and FIG. 2(b) any number of multiple coils with appropriate phase shifting between coils may used in other examples of the invention to achieve electromechanical stirring in full-bridge resonant mode.

A seven-to-one change in resonant frequency between half-bridge and full-bridge modes is a typical range in frequency change for the power supply apparatus of the present invention.

Figure 3A:
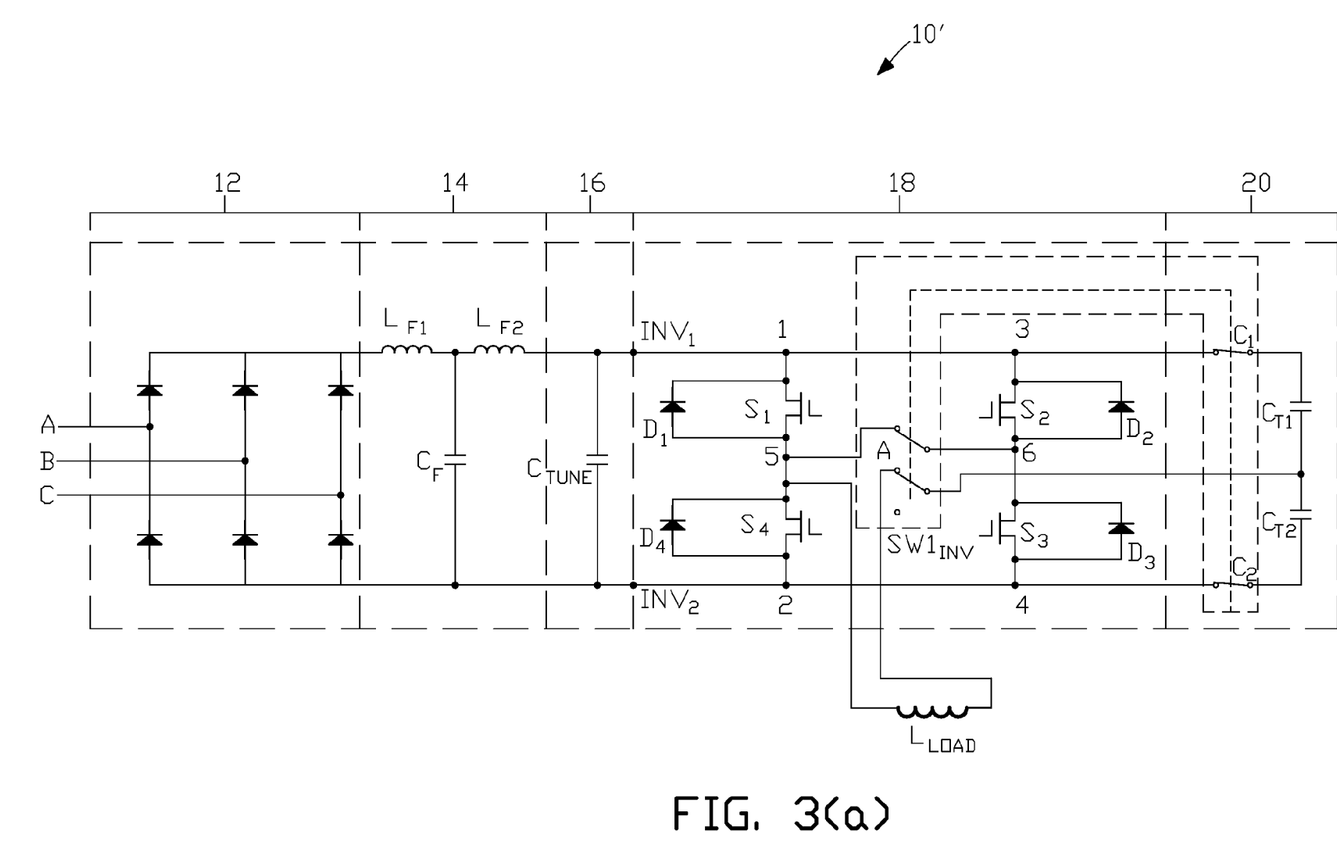
FIG. 3(a) illustrates another example of a power supply apparatus used in the present invention configured for inverter half-bridge series-resonance operation.
Figure 3B:
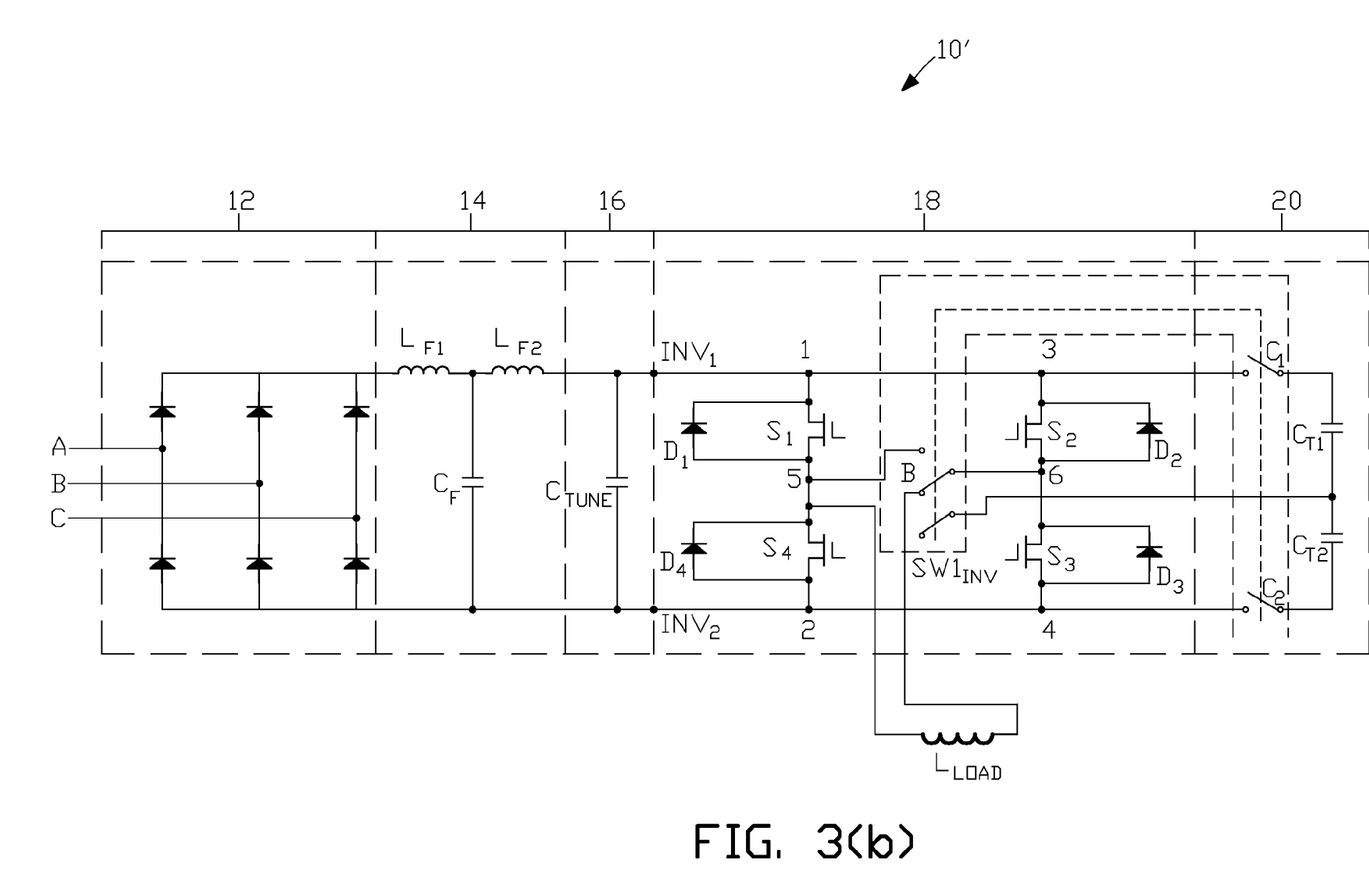
FIG. 3(b) illustrates the power supply apparatus in FIG. 3(a) configured for inverter full-bridge operation.

There is shown in FIG. 3(a) and FIG. 3(b) another example of the present invention, which is similar to the example in FIG. 1(a) and FIG. 1(b) except that inverter switch SW1$_{INV}$ includes switching contacts C1 and C2 for switching tank capacitors C$_{T1}$ and C$_{T2}$ out of the circuit when operating in the full bridge resonance (low frequency) mode. This arrangement can be advantageous to avoid ringing in the circuit between tuning capacitor C$_{TUNE}$ and the tank capacitors. As with the example of the invention in FIG. 1(a) and FIG. 1(b), in half-bridge mode, power output from the inverter is controlled by changing the inverter operating frequency and pulse width modulation, and in full bridge resonance mode, power output from the inverter can be controlled solely by pulse width modulation. As with the example of the invention in FIG. 1(a) and FIG. 1(b), a seven-to-one change in resonant frequency between half-bridge and full-bridge modes is a typical range in frequency change for the power supply apparatus of the present invention shown in FIG. 3(a) and FIG. 3(b).

Figure 4A:
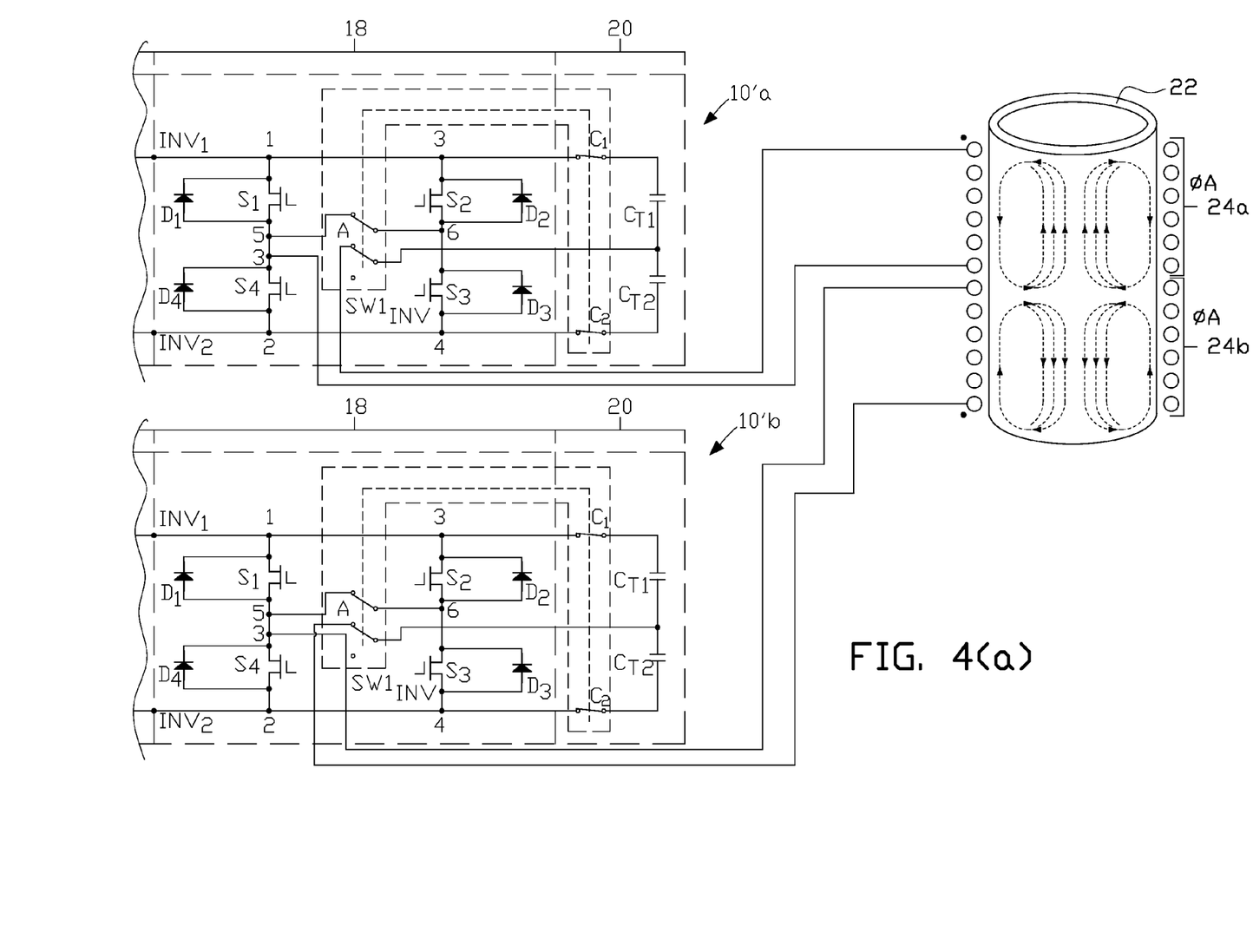
FIG. 4(a) illustrates another example of a power supply apparatus used in the present invention configured for electric induction melting of an electrically conductive material placed within a crucible.
Figure 4B:
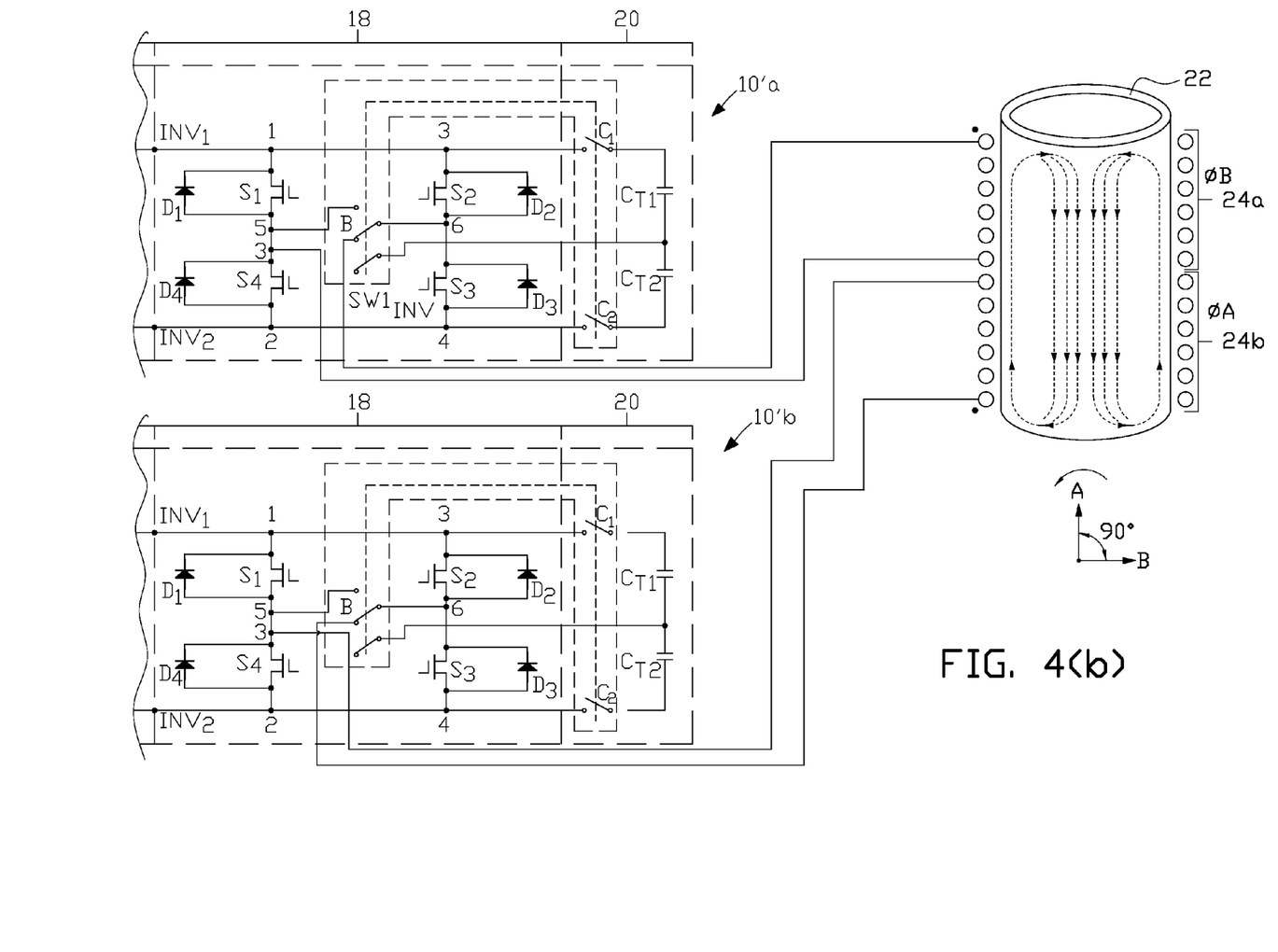
FIG. 4(b) illustrates the power supply apparatus in FIG. 4(a) configured for electromagnetic stirring of an electrically conductive material placed within the crucible.

FIG. 4(a) and FIG. 4(b) illustrate a heating and stirring application of the circuit arrangement shown in FIG. 3(a) and FIG. 3(b) that is similar to the heating and stirring application of the circuit arrangement shown in FIG. 2(a) and FIG. 2(b) except for the modified inverter switch SW1$_{INV}$.

Figure 5A:
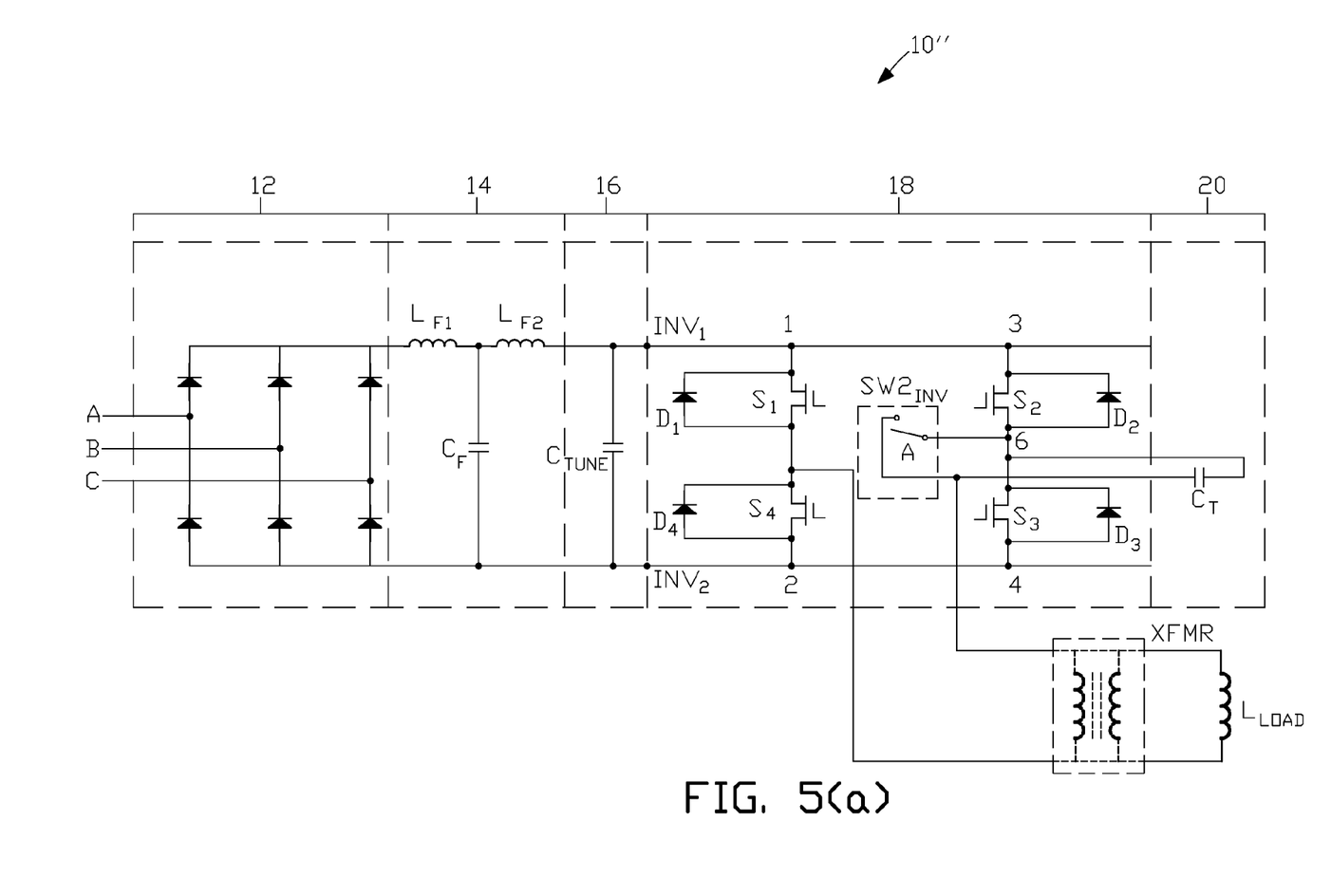
FIG. 5(a) illustrates another example of a power supply apparatus used in the present invention configured for inverter high frequency series-resonance operation.
Figure 5B:
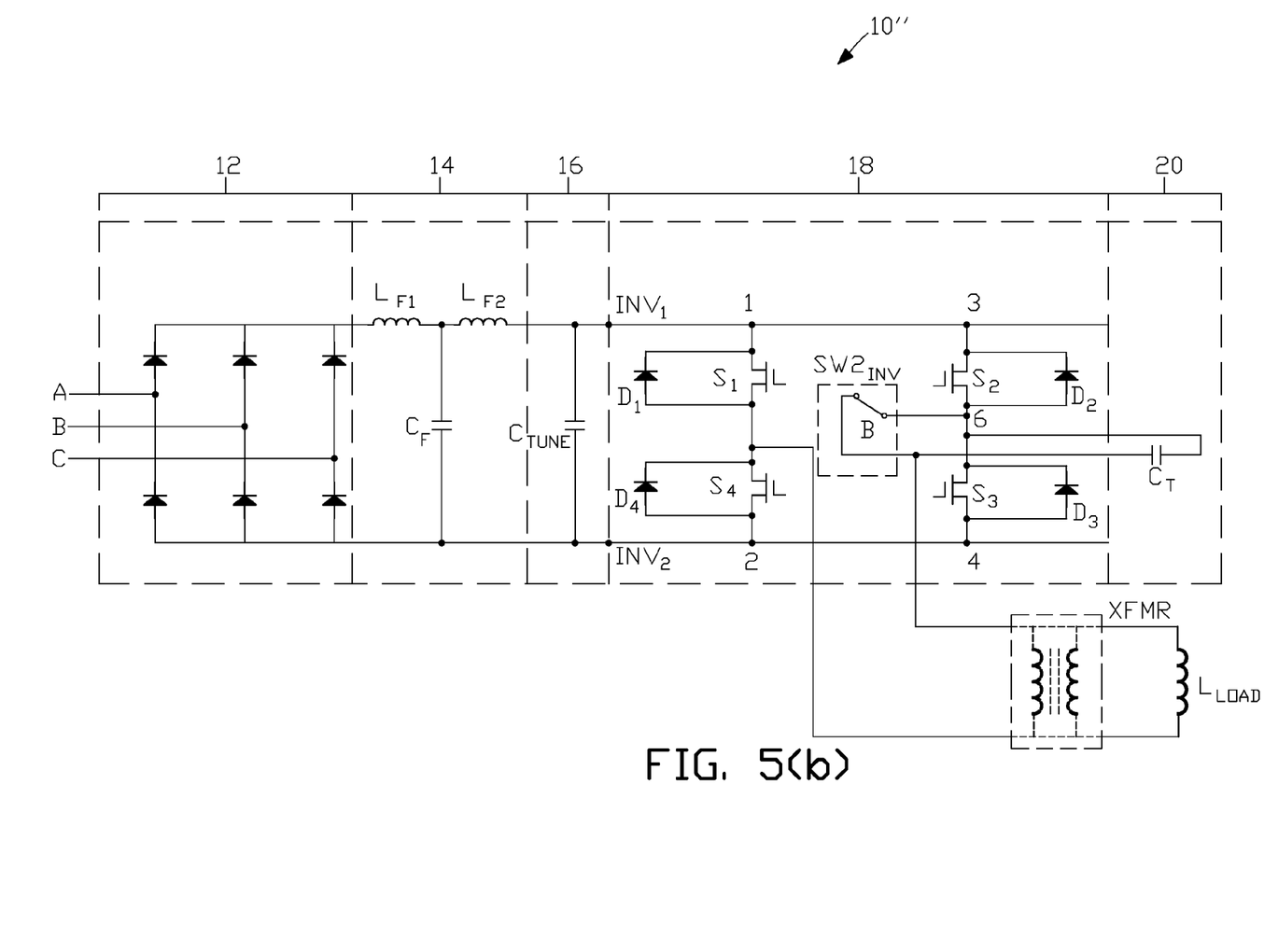
FIG. 5(b) illustrates the power supply apparatus in FIG. 5(a) configured for inverter low frequency series resonance operation.

There is shown in FIG. 5(a) and FIG. 5(b) another example of the present invention where a full bridge resonance mode is used for both high frequency mode, with tank capacitor C$_T$ in the circuit as shown in FIG. 5(a), and low frequency mode, with tank capacitor C$_T$ shorted out by inverter switch SW2$_{INV}$ as shown in FIG. 5(b).

For the high frequency mode in FIG. 5(a), the output frequency of the inverter will be near resonance, that is within plus or minus 20 percent of actual resonant frequency, f$_{RES1}$, which can be calculated from the following equation:

$$f_{RES1} = \frac{1}{2\pi\sqrt{L_{LOAD} \cdot C_T}}. \quad [\text{equation (3)}]$$

For low frequency mode in FIG. 5(b), the output frequency of the inverter will be near resonance, that is within plus or minus 20 percent of actual resonant frequency, f$_{RES2}$, which can be calculated from the following equation:

$$f_{RES2} = \frac{1}{2\pi\sqrt{L_{LOAD} \cdot C_{TUNE}}}. \quad [\text{equation (4)}]$$

In the high frequency resonance mode (FIG. 5(a)), power output from the inverter is controlled by changing the inverter operating frequency and pulse width modulation, and in the low frequency resonance mode (FIG. 5(b)), power output from the inverter can be controlled solely by pulse width modulation. A seven-to-one change in resonant frequency between high frequency and low frequency modes is a typical range in frequency change for the power supply apparatus of the present invention shown in FIG. 5(a) and FIG. 5(b).

In some applications of the invention shown in FIG. 5(a) and FIG. 5(b), optional step-down voltage transformer XFMR may be utilized to increase the impedance at the output of the inverter when the load impedance is low.

Figure 6A:
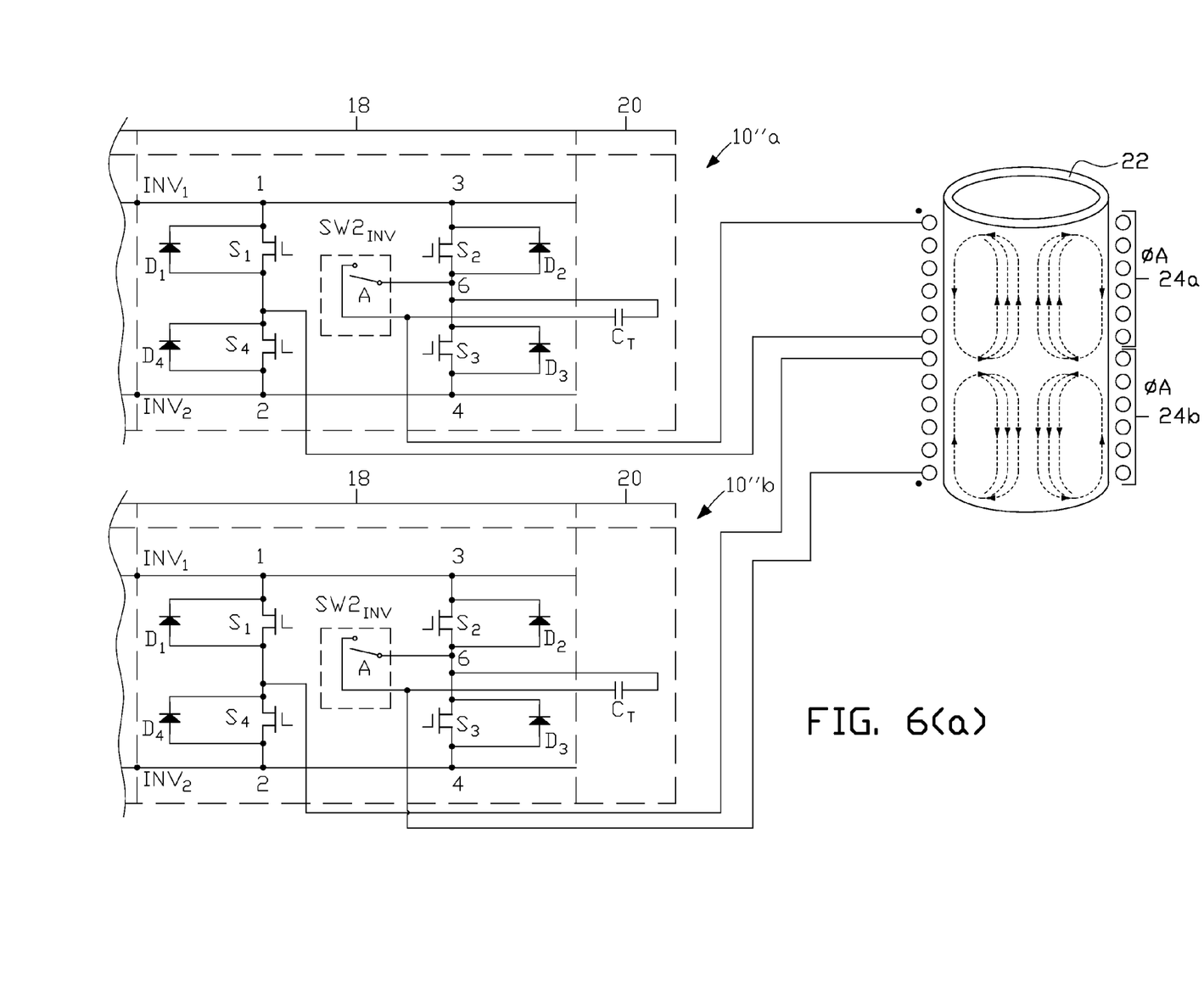
FIG. 6(a) illustrates another example of a power supply apparatus used in the present invention configured for electric induction melting of an electrically conductive material placed within a crucible.
Figure 6B:
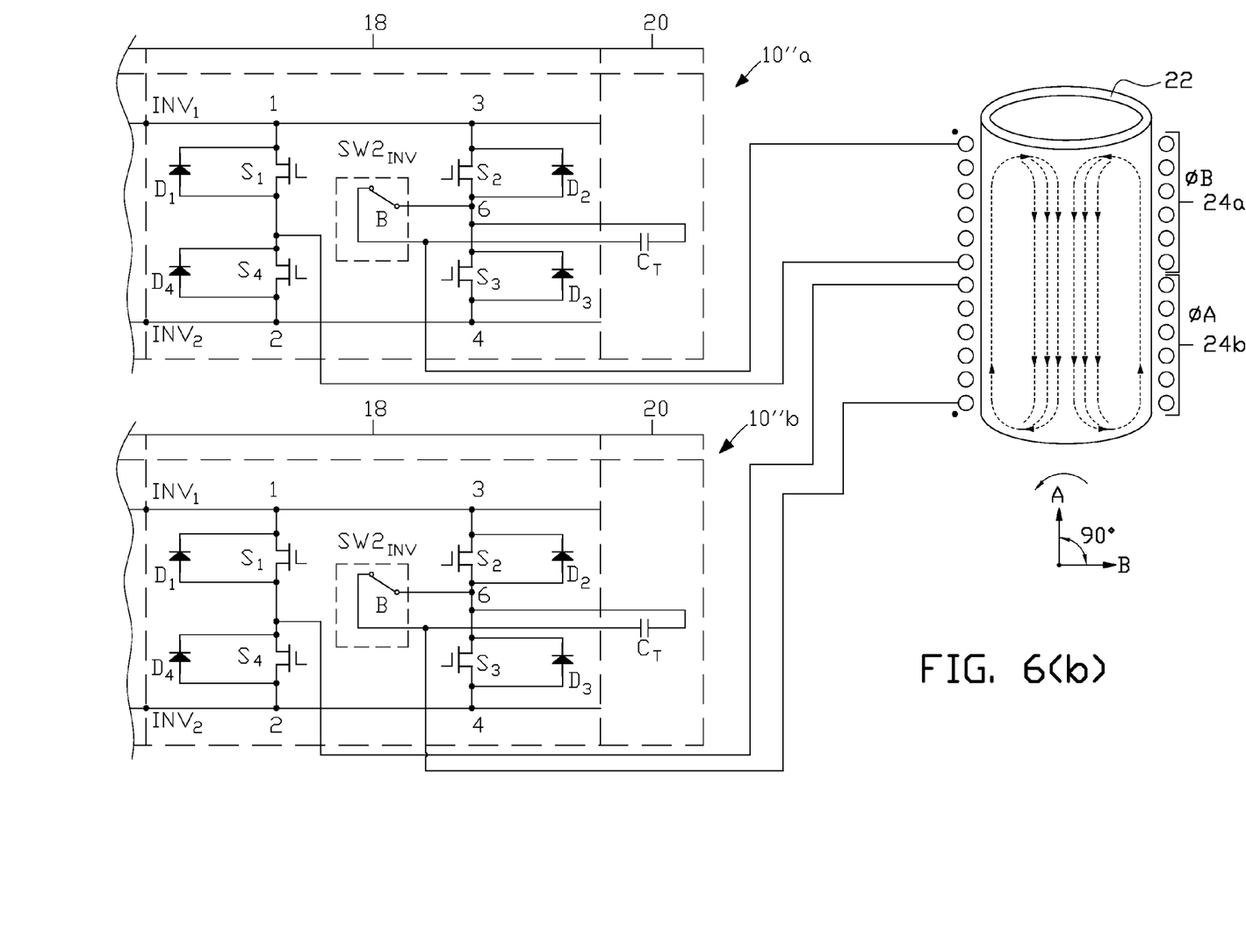
FIG. 6(b) illustrates the power supply apparatus in FIG. 6(a) configured for electromagnetic stirring of an electrically conductive material placed within the crucible.

FIG. 6(a) and FIG. 6(b) illustrate a heating and stirring application of the circuit arrangement shown in FIG. 5(a) and FIG. 5(b) that is similar to the heating and stirring application of the circuit arrangement shown in FIG. 2(a) and FIG. 2(b).

A susceptor vessel may be used in some examples of the invention in lieu of crucible 22, to melt materials such as silicon. The half bridge, (or high frequency), mode may be used to concentrate inductive heating in the susceptor vessel to initially melt a substantially solid composition of silicon placed in the susceptor vessel by conduction and convection since solid silicon is not electrically conductive, and the full bridge, (or low frequency), mode may be used for electromagnetic stirring of at least a partially molten silicon composition in the susceptor vessel since a molten silicon composition is electrically conductive. For the example of the invention shown in FIG. 5(a) and FIG. 5(b) where a full bridge arrangement is used for both low and high frequency modes, the high frequency mode (tank capacitor in circuit) may be used to concentrate inductive heating in the susceptor vessel to initially melt a substantially solid composition of silicon placed in the susceptor vessel by conduction and convection since solid silicon is not electrically conductive, and the low frequency mode (tank capacitor shorted out) may be used for electromagnetic stirring of at least a partially molten silicon composition in the susceptor vessel since molten silicon composition is electrically conductive.

Alternatively the susceptor may be in the geometric shape of an open cylinder with the induction coils surrounding the exterior of the cylinder and a workpiece passing through the interior of the cylinder so that the workpiece absorbs heat by conduction from the inductively heated susceptor.

In other examples of the invention an electrically conductive workpiece may be placed within the vicinity of magnetic fields established by current flow through $L_{LOAD}$ so that the workpiece may be selectively heat treated at different frequencies.

The present invention has been described in terms of preferred examples and embodiments. Equivalents, alternatives and modifications, aside from those expressly stated, are possible and within the scope of the invention.

The invention claimed is:

1. A method of dual frequency electric induction heating, melting or stirring of a composition or workpiece in an inductive load circuit, the method comprising the step of inserting a dual frequency switch at the output of a H-bridge inverter to the inductive load circuit, the H-bridge inverter having a resonant load tuning capacitance connected across the direct current input to the H-bridge inverter and a tank capacitance connected across the legs of the H-bridge inverter, the dual frequency switch having a low frequency switch position and a high frequency switch position, where in the high frequency switch position the H-bridge inverter operates as a half bridge inverter with each of the legs of the H-bridge inverter connected in parallel by the dual frequency switch, and in the low frequency switch position the H-bridge inverter operates as a full bridge inverter.

2. The method of claim 1 further comprising the step of controlling the output power from the H-bridge inverter by inverter output frequency control and pulse width modulation control when the dual frequency switch is in the low frequency switch position, and by inverter pulse width modulation control in the high frequency switch position.

3. The method of claim 1 wherein the composition or workpiece comprises an electrically conductive material in a crucible, the method further comprising the steps of:
 counter-winding at least two adjacent induction coils around the exterior height of the crucible;
 connecting the output of each one of two of the H-bridge inverters exclusively to one of the at least two adjacent induction coils;
 operating each one of the two of the H-bridge inverters with the dual frequency switch in the high frequency switch position and synchronized phase outputs to inductively melt the electrically conductive material, and
 operating each one of the two of the H-bridge inverters with the dual frequency switch in the low frequency switch position and 90 degrees shifted phase outputs to electromagnetically stir the electrically conductive material.

4. The method of claim 1 wherein the composition or workpiece comprises a solid silicon composition deposited in a susceptor vessel, the method further comprising the steps of:
 winding at least one induction coil around the exterior high of the susceptor vessel;
 connecting the output of the H-bridge inverter to the at least one induction coil;
 operating the H-bridge inverter with the dual frequency switch in the high frequency switch position to inductively heat the susceptor to at least partially melt the solid silicon composition by conduction and convection of heat from the susceptor to form an at least partially molten mass of silicon; and
 operating the H-bridge inverter with the dual frequency switch in the low frequency switch position to electromagnetically stir the at least partially molten mass of silicon.

5. The method of claim 1 further comprising the step of removing the tank capacitance from the H-bridge inverter circuit when the dual frequency switch is in the low frequency switch position.

6. The method of claim 5 further comprising the step of controlling the output power from the H-bridge inverter by inverter output frequency control and pulse width modulation control when the dual frequency switch is in the high frequency switch position, and by inverter pulse width modulation control in the low frequency switch position.

7. The method of claim 5 wherein the composition or workpiece comprises an electrically conductive material in a crucible, the method further comprising the steps of:
 counter-winding at least two adjacent induction coils around the exterior height of a crucible;
 connecting the output of each one of two of the H-bridge inverters exclusively to one of the at least two adjacent induction coils;
 operating each one of the two H-bridge inverters with the dual frequency switch in the high frequency switch position and synchronized phase outputs to inductively melt an electrically conductive composition, and
 operating each one of the two H-bridge inverters with the dual frequency switch in the low frequency switch position and 90 degrees shifted phase outputs to electromagnetically stir the electrically conductive material.

8. The method of claim 5 wherein the composition or workpiece comprises a solid silicon composition deposited in a susceptor vessel, the method further comprising the steps of:
   winding at least one induction coil around the exterior high of a susceptor vessel;
   connecting the output of the H-bridge inverter to the at least one induction coil;
   operating the H-bridge inverter with the dual frequency switch in the high frequency switch position to inductively heat the susceptor to at least partially melt the solid silicon composition by conduction and convection of heat from the susceptor to form an at least partially molten mass of silicon; and
   operating the H-bridge inverter with the dual frequency switch in the low frequency switch position to electromagnetically stir the at least partially molten mass of silicon.

9. A method of dual frequency electric induction heating, melting or stirring, of a composition or workpiece in an inductive load circuit, the method comprising the step of inserting a dual frequency switch across a tank capacitance of a full bridge inverter having a resonant load tuning capacitor connected across the direct current input of the full bridge inverter, the dual frequency switch having a low frequency switch position and a high frequency switch position, where in the high frequency switch position the tank capacitance is in the inverter circuit and in the low frequency switch position the dual frequency switch shorts out the tank capacitance.

10. The method of claim 9 further comprising the step of controlling the output power from the H-bridge inverter by inverter output frequency control and pulse width modulation control when the dual frequency switch is in the high frequency switch position, and by inverter pulse width modulation control in the low frequency switch position.

11. The method of claim 9 wherein the composition or workpiece comprises an electrically conductive material in a crucible, the method further comprising the steps of:
   counter-winding at least two adjacent induction coils around the exterior height of the crucible;
   connecting the output of each one of two of the H-bridge inverters exclusively to one of the at least two adjacent induction coils;
   operating each one of the two of the H-bridge inverters with the dual frequency switch in the high frequency switch position and synchronized phase outputs to inductively melt an electrically conductive composition placed in the crucible, and
   operating each one of the two of the H-bridge inverters with the dual frequency switch in the low frequency switch position and 90 degrees shifted phase outputs to electromagnetically stir the electrically conductive material.

12. The method of claim 9 wherein the composition or workpiece comprises a solid silicon composition deposited in a susceptor vessel, the method further comprising the steps of:
   winding at least one induction coil around the exterior high of a susceptor vessel;
   connecting the output of the H-bridge inverter to the at least one induction coil;
   operating the H-bridge inverter with the dual frequency switch in the high frequency switch position to inductively heat the susceptor to at least partially melt the solid silicon composition by conduction and convection of heat form the susceptor to form an at least partially molten mass of silicon; and
   operating the H-bridge inverter with the dual frequency switch in the low frequency switch position to electromagnetically stir the at least partially molten mass of silicon.

13. The method of claim 9 further comprising the step of inserting a voltage step-down transformer between the output of the H-bridge inverter and the inductive load circuit.

* * * * *